UNITED STATES PATENT OFFICE.

CHARLES ANTOINE HEUDEBERT, OF NANTERRE, FRANCE.

MANUFACTURE OF BREAD.

950,920.      Specification of Letters Patent.      Patented Mar. 1, 1910.

No Drawing.     Application filed January 21, 1903. Serial No. 139,889.

*To all whom it may concern:*

Be it known that I, CHARLES ANTOINE HEUDEBERT, of 3 Rue du Chemin de Fer, Nanterre, Seine, Republic of France, baker, have invented Improvements in the Manufacture of Bread, of which the following is a full, clear, and exact description.

This invention relates to the manufacture of bread and the like, in which is incorporated a soluble casein.

For a long time doctors and hygienists have sought a food containing all the elements necessary for the nutrition of the human organism. The food usually employed, although excellent for ordinary purposes, are in many cases far from fulfilling the requirements of invalids. In most cases they contain only one or two of the indispensable elements; from this results the necessity for consuming several different foods which are frequently not readily digestible, thus overloading the stomach and producing dyspepsia. The process for the manufacture of bread in which casein is incorporated, which forms the subject of this invention, obviates these defects, as the bread presents, in a readily assimilable form, in a reduced volume and in suitable proportions, all the nutritive elements called for by the human organism for its support and growth. It has been found that when flour, water and casein are directly mixed, a paste or dough is obtained which is not homogeneous, said paste as soon as cooked has a reddish aspect and the casein, not being completely incorporated in the flour, forms lumps.

The process herein described permits of adding the casein in large proportions to flour rich in gluten, and permits the complete incorporation of the casein thus avoiding the formation of lumps.

This bread is composed of the following products:

1. A special flour which upon analysis should show a constitution of about 43.50% of moist gluten and 0.80% of fatty matters.

2. A soluble casein obtained from mills. This soluble casein should be in the proportion of about 30% of casein to 70% of the flour employed.

3. Marine salt in the proportion of 20 grams per 500 grams of water.

4. Yeast about 20 grams only.

The process of manufacture is as follows: The 20 grams of yeast to be employed are crumbled in a vessel into which is then poured a liter of warm water in which the yeast is caused to froth; about 350 grams of the special flour are then poured into this water and the whole is mixed, by which means a paste identical with that for pancakes should be formed. The mixing of this semi-liquid paste should be continued until no lumps of flour remain. The paste is then allowed to ferment for about two hours. If the yeast is of inferior quality, or if the external temperature is low this lapse of time may not be sufficient. The paste is ready when, having double its volume, it has become frothy; at this moment, the salt is dissolved in a small quantity of warm water, and mixed with the liquid paste. The casein is then added after being first mixed with the rest of the flour, and kneading is effected until the paste becomes of an elastic consistency. This may take from 15 to 20 minutes; the kneading is then finished. The dough is then allowed to remain for about 20 minutes in order to render it more easy to handle. The dough is then ready for conversion into loaves of dough. Each loaf weighs about 20 grams. The operator cuts off a piece of dough, rolls it into a very thin baton, places it upon a sheet metal plate; each rod is arranged at about 4 centimeters from the other. When the plate has been filled the operator equalizes the length of the batons. The plate is then placed in a place where the temperature is fairly high, say about 25° C., covered with a cloth and left to rise for from one to two hours. The heat of the oven should be moderate and uniform. The baking lasts for about twenty minutes; it is finished when the batons assume a golden brown color. The batons are removed from the oven and immediately placed in a drying chamber regulated from 60° to 80° C. where they remain two hours. This method is also suitable for the manufacture of loaves for the commissariat of the army and navy; in this case the proportion of casein may be reduced to 12%.

Claim.

A process for the manufacture of bread, consisting in preparing a semi-liquid paste by means of flour, containing about 43% of moist gluten, yeast and water, in letting this paste ferment for about two hours in order to make it frothy, in adding to this frothy paste a mixture of the same flour, salt and a soluble casein, the casein being in the proportion of about 30% to 70% of flour employed, in kneading the whole up to the moment the paste attains an elastic consistency, in cutting the dough into loaves, in letting it rise, and then baking the loaves.

The foregoing specification of my "Improvements in and relating to the manufacture of bread and the like" signed by me this 9th day of January 1903.

CHARLES ANTOINE HEUDEBERT.

Witnesses:
AUGUSTUS E. INGRAM,
MAURICE H. PIGNET.